US012224092B2

(12) United States Patent
Kojima et al.

(10) Patent No.: US 12,224,092 B2
(45) Date of Patent: Feb. 11, 2025

(54) COMPRESSION MOLDED CORE, METHOD FOR MANUFACTURING THE COMPRESSION MOLDED CORE, INDUCTOR INCLUDING THE COMPRESSION MOLDED CORE, AND ELECTRIC/ELECTRONIC EQUIPMENT MOUNTED WITH THE INDUCTOR

(71) Applicant: Alps Alpine Co., Ltd., Tokyo (JP)

(72) Inventors: Akinori Kojima, Niigata-ken (JP); Ryo Nakabayashi, Niigata-ken (JP); Keiichiro Sato, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 672 days.

(21) Appl. No.: 17/227,019

(22) Filed: Apr. 9, 2021

(65) Prior Publication Data

US 2021/0233690 A1 Jul. 29, 2021

Related U.S. Application Data

(63) Continuation of application No. PCT/JP2019/040011, filed on Oct. 10, 2019.

(30) Foreign Application Priority Data

Oct. 30, 2018 (JP) ................................ 2018-203685

(51) Int. Cl.
*H01F 1/08* (2006.01)
*H01F 1/147* (2006.01)
(Continued)

(52) U.S. Cl.
CPC ........... *H01F 1/08* (2013.01); *H01F 1/14741* (2013.01); *H01F 1/14766* (2013.01);
(Continued)

(58) Field of Classification Search
CPC .......... H01F 1/26; H01F 1/04; H01F 1/14741; H01F 1/14766; H01F 1/153; H01F 1/22;
(Continued)

(56) References Cited

U.S. PATENT DOCUMENTS 10,283,266 B2 * 5/2019 Nakabayashi .......... H01F 1/153
2011/0080248 A1 4/2011 Nishimura
(Continued)

FOREIGN PATENT DOCUMENTS

JP 2010-118486 5/2010
JP 2011-192729 9/2011
(Continued)

OTHER PUBLICATIONS

International Search Report from International Application No. PCT/JP2019/040011 dated Dec. 10, 2019.

*Primary Examiner* — C Melissa Koslow
(74) *Attorney, Agent, or Firm* — Beyer Law Group LLP

(57) ABSTRACT

A compression molded core contains a plurality of soft magnetic material powders. A first powder and a second powder in the plurality of powders satisfy D1>D2, 0.23≤(D1−D2)/D1<0.6, D1≤7 μm, and 3 μm≤DT≤5.7 μm. D1 is the median diameter, which is a particle size at which the integrated particle diameter distribution from the small particle size side is 50% in a volume-based particle size distribution measured by a laser diffraction/scattering method, of the first powder and is maximum among median diameters; D2 is the median diameter D2 of the second powder and is minimum among median diameters; and DT is determined using the weight rate R1 of the first powder and the weight rate R2 of the second powder by R1×D1+R2×D2.

20 Claims, 4 Drawing Sheets

(51) Int. Cl.

| | |
|---|---|
| ***H01F 1/153*** | (2006.01) |
| ***H01F 1/22*** | (2006.01) |
| ***H01F 1/26*** | (2006.01) |
| ***H01F 27/255*** | (2006.01) |
| ***H01F 41/02*** | (2006.01) |

(52) U.S. Cl.
CPC ............... *H01F 1/153* (2013.01); *H01F 1/22* (2013.01); *H01F 1/26* (2013.01); *H01F 27/255* (2013.01); *H01F 41/0246* (2013.01); *H01F 1/15308* (2013.01)

(58) Field of Classification Search
CPC . H01F 1/15308; H01F 27/255; H01F 41/0246
See application file for complete search history.

(56) References Cited

U.S. PATENT DOCUMENTS

| | | | | |
|---|---|---|---|---|
| 2017/0309387 | A1* | 10/2017 | Nakabayashi | .......... H01F 1/153 |
| 2018/0308610 | A1 | 10/2018 | Ishida et al. | |
| 2019/0333665 | A1 | 10/2019 | Maruyama et al. | |

FOREIGN PATENT DOCUMENTS

| | | | |
|---|---|---|---|
| JP | 2018-182203 | | 11/2018 |
| WO | 2009/139368 | | 11/2009 |
| WO | 2018/142666 | | 8/2018 |
| WO | WO 2018/207521 | * | 11/2018 |

* cited by examiner

COMPRESSION MOLDED CORE, METHOD FOR MANUFACTURING THE COMPRESSION MOLDED CORE, INDUCTOR INCLUDING THE COMPRESSION MOLDED CORE, AND ELECTRIC/ELECTRONIC EQUIPMENT MOUNTED WITH THE INDUCTOR

CLAIM OF PRIORITY

This application is a Continuation of International Application No. PCT/JP2019/040011 filed on Oct. 10, 2019, which claims benefit of Japanese Patent Application No. 2018-203685 filed on Oct. 30, 2018. The entire contents of each application noted above are hereby incorporated by reference.

BACKGROUND OF THE INVENTION

1. Field of the Invention

The present invention relates to a compression molded core, a method for manufacturing the compression molded core, an inductor including the compression molded core, and electric/electronic equipment mounted with the inductor. In the present specification, the term "inductor" means a passive element including a core material, such as a compression molded core, and a coil.

2. Description of the Related Art

In electronic equipment, such as smartphones, tablet terminators, and laptop computers, demands for miniaturization, weight reduction, and high-performance are being increasing. In order to correspond to these demands, the switching power supply circuit in electronic equipment is required to be able to cope with high frequencies. Therefore, the inductor incorporated in the switching power supply circuit is also required to be able to be stably driven at a high frequency.

For a purpose of providing a constituent material of a magnetic element capable of coping with a high drive frequency, Japanese Unexamined Patent Application Publication No. 2011-192729 describes a metal magnetic material powder including a first powder having an average first particle diameter and a second powder having an average second particle diameter, wherein the ratio of the average first particle diameter and the average second particle diameter is ⅛ to ⅓, and the mixing ratio of the first powder and the second powder in volume is 10/90 to 25/75.

In recent years, a demand for miniaturization of switching power supply circuits, especially, DC-DC converters, is particularly rising, and as a result of responding to this demand, a large direct current flows in the inductor incorporated in the inside despite of its small size. Consequently, the magnetic environment where the magnetic material constituting the inductor is placed is an environment where, in a state in which an inductive magnetic field caused by the direct current is applied as a bias, a variable magnetic field caused by current fluctuation (ripple current) based on switching at a high frequency is further applied. Accordingly, the magnetic material constituting an inductor is being required to have appropriate magnetic properties (e.g., high relative magnetic permeability and low core loss) in such a magnetically severe environment.

In view of this situation, the present invention provides a compression molded core suitable as a constituent member of an inductor having good magnetic properties even in a magnetically severe environment and capable of being used as a material of an inductor including such a compression molded core, a method for manufacturing the compression molded core, an inductor including the compression molded core, and electric/electronic equipment mounted with the inductor.

SUMMARY OF THE INVENTION

The present invention provided to solve the above mentioned problems is, in one aspect, a compression molded core containing a plurality of powders each consisting of a soft magnetic material. When the median diameter, which is a particle size at which the integrated particle diameter distribution from the small particle size side is 50% in a volume-based particle size distribution measured by a laser diffraction/scattering method, is measured for each of the plurality of powders, any of the following first to third requirements is satisfied by a first median diameter D1, a second median diameter D2, and an average median diameter DT defined as follows:

First median diameter D1: the median diameter of a first powder the median diameter of which is maximum among the median diameters;

Second median diameter D2: the median diameter of a second powder the median diameter of which is minimum among the median diameters; and Average median diameter DT: a median diameter calculated using a first rate R1 that is the rate of the weight of the first powder to the sum of the weight of the first powder and the weight of the second powder in the compression molded core, a second rate R2 that is the rate of the weight of the second powder to the sum of the weight of the first powder and the weight of the second powder in the compression molded core, the first median diameter, and the second median diameter as R1×D1+R2×D2.

Incidentally, the compression molded core may include two powders each consisting of a soft magnetic material. In this case, the powders of soft magnetic materials included in the compression molded core are a first powder and a second powder.

First Requirement

In the first requirement, the following expressions (1-1) to (1-4) are satisfied.

$$D1>D2 \tag{1-1}$$

$$0.23\leq(D1-D2)/D1<0.3 \tag{1-2}$$

$$D1\leq 5.9\ \mu m \tag{1-3}$$

$$3\ \mu m\leq DT\leq 5.7\ \mu m \tag{1-4}$$

Second Requirement

In the second requirement, the following expressions (2-1) to (2-4) are satisfied by a compression molded core.

$$D1>D2 \tag{2-1}$$

$$0.3\leq(D1-D2)/D1\leq 0.59 \tag{2-2}$$

$$D1\leq 7\ \mu m \tag{2-3}$$

$$3\ \mu m\leq DT\leq 5.7\ \mu m \tag{2-4}$$

Third Requirement

In the third requirement, the following expressions (3-1) to (3-5) are satisfied by a compression molded core.

$$D1>D2 \quad (3\text{-}1)$$

$$0.3 \leq (D1-D2)/D1 \leq 0.6 \quad (3\text{-}2)$$

$$D1 \leq 7\ \mu m \quad (3\text{-}3)$$

$$D2 \leq 3.9\ \mu m \quad (3\text{-}4)$$

$$3\ \mu m \leq DT \leq 5.7\ \mu m \quad (3\text{-}5)$$

In the third requirement, at least one of the following expressions (3-6) and (3-7) is preferably satisfied.

$$DT \geq 4.4\ \mu m \quad (3\text{-}6)$$

$$(D1-D2)/D1 \geq 0.49 \quad (3\text{-}7)$$

In an inductor including a compression molded core satisfying any of the first to third requirements, the first powder may be a powder of an amorphous magnetic material. In this case, the amorphous magnetic material may preferably include an Fe-based amorphous alloy containing at least Fe, P, and C. This Fe-based amorphous alloy may more preferably further contain at least Ni, B, and Cr.

The second powder may be a powder of a crystalline magnetic material. In this case, the crystalline magnetic material may preferably include at least one of an Fe—Si—Cr alloy and an Fe—Ni alloy.

In one specific example, the first powder is a powder of an amorphous magnetic material, and the second powder is a powder of a crystalline magnetic material. In this case, the rate of the weight of the first powder to the sum of the weight of the first powder and the weight of the second powder may be preferably 30 mass % or more and 70 mass % or less.

The compression molded core may contain a binding component binding the powder of the crystalline magnetic material and the powder of the amorphous magnetic material to another material contained in the compression molded core. Here, the binding component preferably includes a component based on a resin material.

The present invention provides, as another aspect, a method for manufacturing the compression molded core containing a binding component including a component based on a resin material. The manufacturing method includes a molding step of obtaining a molded product by a molding process including pressure molding of a mixture including a first powder, a second powder, and a binder component consisting of a resin material. The molding process in this method is preferably compression molding by pressurizing at about 0.5 GPa to about 2 GPa in a temperature environment of around ordinary temperature, from the viewpoint of increasing the productivity.

The present invention provides, as another aspect, an inductor including the compression molded core according to the above-described aspect of the present invention, a coil, and connection terminals connected to each of the ends of the coil. In the inductor, the compression molded core is disposed so as to be at least partially located in an inductive magnetic field generated by a current when the current flows in the coil through the connection terminals. Even if the inductor is small-sized and has a low profile, the core is unlikely to cause insulation breakdown or to be damaged, and the direct-current superimposition characteristics are also excellent, based on the excellent characteristics of the compression molded core.

In the inductor, the initial permeability μ(0) measured at a condition of 1 MHz, the relative magnetic permeability μ(8) measured at a condition of 1 MHz when the external magnetic field is 8 kA/m, and the iron loss Pcv (unit: $kW/m^3$) measured at a condition of applying a magnetic field having an effective maximum magnetic flux density of 15 mT at a frequency of 2 MHz preferably satisfy the following expression (I).

$$\mu(0) \times \mu(8)/Pcv > 3\ kW^{-1}m^3 \quad (I)$$

The present invention also provides, as another aspect, electric/electronic equipment mounted with the inductor according to the above-described aspect of the present invention. In the electric/electronic equipment, the inductor is connected to a substrate with connection terminals. Although the circuit into which the inductor of electric/electronic equipment is incorporated is not particularly limited, when used in a switching power supply circuit, such as a DC-DC converter, it is easy to make use of the advantage of the inductor having excellent direct-current superimposition characteristics. In addition, when the electric/electronic equipment is potable equipment, such as a smartphone, it is easy to make use of the advantage of the inductor easily corresponding to a small size and a low profile.

In the compression molded core according to the present invention, the median diameters (first median diameter D1 and second median diameter D2) of two powders of soft magnetic materials and the median diameter (average median diameter DT) of the mixture powder of these powders satisfy any of the above-mentioned first to third requirements. Accordingly, an inductor including the compression molded core can have, even if it is small-sized, good magnetic properties. In addition, the present invention provides a method for manufacturing the compression molded core, an inductor including the compression molded core, and electric/electronic equipment mounted with the inductor.

DESCRIPTION OF THE PREFERRED EMBODIMENTS

Embodiments of the present invention will now be described in detail.

1. Compression Molded Core

Figure 1:
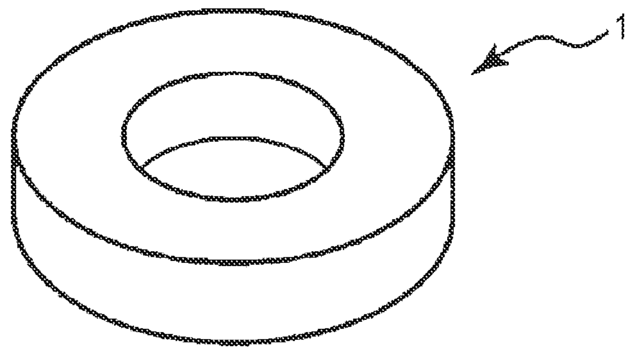
FIG. 1 is a perspective view conceptionally illustrating a shape of a compression molded core according to an embodiment of the present invention.

The compression molded core 1 shown in FIG. 1 according to an embodiment of the present invention is a toroidal core having a ring-like appearance and contains a plurality of powders of soft magnetic materials. Regarding each of these plurality of powders, the median diameter (unit: μm), which is a particle size at which the integrated particle diameter distribution from the small particle size side is 50% in a volume-based particle size distribution measured by a laser diffraction/scattering method, is determined, among the measured plurality of powders, the powder having the maximum median diameter is defined as a first powder, and the median diameter of the first powder is defined as a first median diameter (unit: μm). In addition, among the measured plurality of powders, the powder having the minimum median diameter is defined as a second powder, and the median diameter of the second powder is defined as a second median diameter (unit: μm).

The rate of the weight of the first powder to the sum of the weight of the first powder and the weight of the second powder in the compression molded core 1 is defined as a first rate R1, and the rate of the weight of the second powder to the sum of the weight of the first powder and the weight of the second powder in the compression molded core 1 is defined as a second rate R2. The first rate R1 and the second rate R2 are each a real number of greater than 0 and less than 1 and satisfy R1+R2=1. A parameter calculated using the first rate R1, the second rate R2, the first median diameter D1, and the second median diameter D2 as R1×D1+R2×D2 is defined as an average median diameter (unit: μm).

In the present embodiment, as a specific example, the compression molded core 1 includes two powders of soft magnetic materials. That is, in the present embodiment, the powders of soft magnetic materials included in the compression molded core 1 are a first powder and a second powder. The first powder that is a powder having a larger median diameter is a powder of an amorphous magnetic material, and the second powder that is a powder having a smaller median diameter is a powder of a crystalline magnetic material. The compression molded core 1 according to the present embodiment is manufactured by a manufacturing method comprising a molding process including pressure molding of a mixture containing these powders. As an unlimited example, the compression molded core 1 according to the present embodiment contains a binding component binding the first powder (a powder of an amorphous magnetic material) and the second powder (a powder of a crystalline magnetic material) to another material (which may be the same kind of material or may be a different kind of material) contained in the compression molded core 1.

(1) First Requirement

The first powder and the second powder of the compression molded core 1 according to an embodiment of the present invention satisfy the following expressions (1-1) to (1-4) as the first requirement.

$$D1>D2 \quad (1\text{-}1)$$

$$0.23 \le (D1-D2)/D1 < 0.3 \quad (1\text{-}2)$$

$$D1 \le 5.9\ \mu m \quad (1\text{-}3)$$

$$3\ \mu m \le DT \le 5.7\ \mu m \quad (1\text{-}4)$$

An inductor including the compression molded core 1 satisfying the expressions (1-1) to (1-4) satisfy all of the followings: the initial permeability μ(0) measured at a condition of 1 MHz is high; the relative magnetic permeability μ(8) measured at a condition of 1 MHz when the external magnetic field is 8 kA/m is high; and the iron loss Pcv (unit: kW/m$^3$) measured at a condition of applying a magnetic field having an effective maximum magnetic flux density of 15 mT at a frequency of 2 MHz is low. Accordingly, the inductor including the compression molded core 1 satisfying the first requirement can satisfy the following expression (I):

$$P1=\mu(0)\times\mu(8)/Pcv>3\ \text{kW}^{-1}\text{m}^3 \quad (I).$$

In the inductor including the compression molded core 1 satisfying the first requirement, in a preferred case, the P1 of the expression (I) is 4 or more, and in a more preferred case, the P1 is 5 or more.

(2) Second Requirement

The first powder and the second powder of the compression molded core 1 according to another embodiment of the present invention satisfy the following expressions (2-1) to (2-4) as the second requirement.

$$D1>D2 \quad (2\text{-}1)$$

$$0.3 \le (D1-D2)/D1 \le 0.59 \quad (2\text{-}2)$$

$$D1 \le 7\ \mu m \quad (2\text{-}3)$$

$$3\ \mu m \le DT \le 5.7\ \mu m \quad (2\text{-}4)$$

An inductor including the compression molded core 1 satisfying the expressions (2-1) to (2-4) satisfy all of the followings: the initial permeability μ(0) measured at a condition of 1 MHz is high; the relative magnetic permeability μ(8) measured at a condition of 1 MHz when the external magnetic field is 8 kA/m is high; and the iron loss Pcv (unit: kW/m$^3$) measured at a condition of applying a magnetic field having an effective maximum magnetic flux density of 15 mT at a frequency of 2 MHz is low. Accordingly, the inductor including the compression molded core 1 satisfying the second requirement can satisfy the following expression (I):

$$P1=\mu(0)\times\mu(8)/Pcv>3\ \text{kW}^{-1}\text{m}^3 \quad (I).$$

In the inductor including the compression molded core 1 satisfying the second requirement, in a preferred case, the P1 of the expression (I) is 4 or more, and in a more preferred case, the P1 is 5 or more. In the inductor including the compression molded core 1 satisfying the second requirement, in a further preferred case, the P1 is 6 or more, and in a particularly preferred case, the P1 is 7 or more.

(3) Third Requirement

The first powder and the second powder of the compression molded core 1 according to another embodiment of the present invention satisfy the following expressions (3-1) to (3-5) as the third requirement and, in one preferable example, satisfy at least one of the following expressions (3-6) and (3-7).

$$D1>D2 \quad (3\text{-}1)$$

$$0.3 \le (D1-D2)/D1 \le 0.6 \quad (3\text{-}2)$$

$$D1 \le 7\ \mu m \quad (3\text{-}3)$$

$$D2 \le 3.9\ \mu m \quad (3\text{-}4)$$

$$3\ \mu m \le DT \le 5.7\ \mu m \quad (3\text{-}5)$$

$$DT \ge 4.4\ \mu m \quad (3\text{-}6)$$

$$(D1-D2)/D1 \ge 0.49 \quad (3\text{-}7)$$

An inductor including the compression molded core 1 satisfying the expressions (3-1) to (3-5) satisfy all of the followings: the initial permeability μ(0) measured at a condition of 1 MHz is high; the relative magnetic permeability μ(8) measured at a condition of 1 MHz when the external magnetic field is 8 kA/m is high; and the iron loss Pcv (unit: kW/m$^3$) measured at a condition of applying a magnetic field having an effective maximum magnetic flux density of 15 mT at a frequency of 2 MHz is low. Accordingly, the inductor including the compression molded core 1 satisfying the third requirement can satisfy the following expression (I):

$$P1=\mu(0)\times\mu(8)/Pcv>3\ \mathrm{kW^{-1}m^3} \quad \text{(I)}.$$

In the inductor including the compression molded core 1 satisfying the third requirement, in a preferred case, the P1 of the expression (I) is 4 or more, and in a more preferred case, the P1 is 5 or more. In the inductor including the compression molded core 1 satisfying the third requirement, in a further preferred case, the P1 is 6 or more, and in a particularly preferred case, the P1 is 7 or more. When at least one of the expressions (3-6) and (3-7) is further satisfied, a P1 of 5 or more is stably realized. From the viewpoint of more stably realizing a P1 of 5 or more, it is particularly preferable to satisfy at least one of the following expressions (3-6-1) and (3-7-1).

$$DT\geq 4.66\ \mu\mathrm{m} \quad \text{(3-6-1)}$$

$$(D1-D2)/D1\geq 0.493 \quad \text{(3-7-1)}$$

(4) Powder of Amorphous Magnetic Material (First Powder)

In the present embodiment, the first powder consists of a powder of an amorphous magnetic material. The specific type of this amorphous magnetic material providing the first powder is not limited as long as the material is amorphous (in general X-ray diffractometry, no diffraction spectrum having a clear peak that can identify the material type is obtained) and is a ferromagnetic material, in particular, a soft magnetic material. Examples of the amorphous magnetic material include an Fe—Si—B alloy, an Fe—P—C alloy, and a Co—Fe—Si—B alloy. The amorphous magnetic material preferably includes an Fe-based amorphous alloy (Fe—P—C alloy) containing at least Fe, P, and C and preferably further containing at least Ni, B, and Cr. The amorphous magnetic material may be constituted of one material or may be constituted of a plurality of materials.

Examples of the Fe—P—C alloy include Fe-based amorphous alloys represented by a compositional formula: $Fe_{100atom\ \%-a-b-c-x-y-z-t}Ni_aSn_bCr_cP_xC_yB_zSi_t$, where 0 atom %≤a≤10 atom %, 0 atom %≤b≤3 atom %, 0 atom %≤c≤6 atom %, 6.8 atom %≤x≤13 atom %, 2.2 atom %≤y≤13 atom %, 0 atom %≤z≤9 atom %, and 0 atom %≤t≤7 atom %. In the compositional formula, Ni, Sn, Cr, B, and Si are optional additional elements.

The addition amount a of Ni is preferably 0 atom % or more and 6 atom % or less and more preferably 0 atom % or more and 4 atom % or less. The addition amount b of Sn is preferably 0 atom % or more and 2 atom % or less and may be within a range of 1 atom % or more and 2 atom % or less. The addition amount c of Cr is preferably 0 atom % or more and 2 atom % or less and more preferably 1 atom % or more and 2 atom % or less. The addition amount x of P may be preferably 8.8 atom % or more. The addition amount y of C may be preferably 5.8 atom % or more and 8.8 atom % or less. The addition amount z of B is preferably 0 atom % or more and 3 atom % or less and more preferably 0 atom % or more and 2 atom % or less. The addition amount t of Si is preferably 0 atom % or more and 6 atom % or less and more preferably 0 atom % or more and 2 atom % or less.

The shape of the first powder consisting of a powder of an amorphous magnetic material is not limited. The shape of the powder may be spherical or may be non-spherical. The non-spherical shape may be a shape having shape anisotropy, such as a scale-like, oval spherical, droplet-like, or acicular shape.

The shape of the powder may be the shape obtained when the power is manufactured or may be the shape obtained by secondary processing of a manufactured powder. Examples of the former shape include spherical, oval spherical, droplet-like, and acicular shapes, and examples of the latter include a scale-like shape.

The amorphous magnetic material may be easily formed into a spherical or oval spherical shape due to the manufacturing method. In addition, as a general theory, since an amorphous magnetic material is harder than a crystalline magnetic material, it may be preferable that a crystalline magnetic material is made non-spherical so that it can be easily deformed during pressure molding.

The shape of the first powder consisting of an amorphous magnetic material may be the shape obtained when it is manufactured or may be the shape obtained by secondary processing of a manufactured powder. Examples of the former shape include spherical, oval spherical, and acicular shapes, and examples of the latter include a scale-like shape. The first median diameter D1 of the first powder may be preferably 1 μm or more from the viewpoint of ensuring the handleability.

(5) Powder of Crystalline Magnetic Material (Second Powder)

In the present embodiment, the second powder consists of a powder of a crystalline magnetic material. This crystalline magnetic material providing the second powder is crystalline (in general X-ray diffractometry, a diffraction spectrum having a clear peak that can identify the material type is obtained) and ferromagnetic. Examples of the crystalline magnetic material include an Fe—Si—Cr alloy, an Fe—Ni alloy, a Ni—Fe alloy, an Fe—Co alloy, an Fe—V alloy, an Fe—Al alloy, an Fe—Si alloy, an Fe—Si—Al alloy, carbonyl iron, and pure iron.

Among these materials, from the viewpoint of easily obtaining good magnetic properties, the crystalline magnetic material providing the second powder preferably includes at least one of an Fe—Si—Cr alloy and an Fe—Ni alloy. Among crystalline magnetic materials, the Fe—Si—Cr alloy is a material having a relatively high saturation magnetic flux density, good soft magnetic properties, and a high specific resistance. Accordingly, when compared with another crystalline magnetic material, for example, with a carbonyl iron powder, the loss is low even at a high magnetic field and a high frequency to easily show good magnetic properties. When the crystalline magnetic material providing the second powder includes an Fe—Si—Cr alloy, the content of Si and the content of Cr of the alloy are not limited. As an example without limitation, the content of Si is about 2 to 7 mass %, the content of Cr is about 2 to 7 mass %, and the balance is Fe and inevitable impurities. Examples of the composition of the Fe—Ni alloy include a composition consisting of 50 mass % of Ni and the balance being Fe and inevitable impurities.

The shape of the powder of the amorphous magnetic material contained in the compression molded core 1 according to an embodiment of the present invention is not limited. Since the type of the shape of the powder is the same as that of the powder of a crystalline magnetic material, the description thereof is omitted. Due to the manufacturing method, the amorphous magnetic material may be easily formed into a spherical or oval spherical shape. In addition, as a general theory, since an amorphous magnetic material is harder than a crystalline magnetic material, it may be preferable that a crystalline magnetic material is made non-spherical so that it can be easily deformed during pressure molding.

The shape of the second powder consisting of a powder of a crystalline magnetic material is not limited. The shape of the powder may be spherical or may be non-spherical. The non-spherical shape may be a shape having shape anisotropy, such as a scale-like, oval spherical, droplet-like, or acicular shape.

The shape of a powder may be the shape obtained when the power is manufactured or may be the shape obtained by secondary processing of a manufactured powder. Examples of the former shape include spherical, oval spherical, droplet-like, and acicular shapes, and examples of the latter include a scale-like shape. The second median diameter D2 of the second powder may be preferably 1 μm or more from the viewpoint of ensuring the handleability.

At least a part of the powders (the first powder and the second powder) of soft magnetic materials included in the compression molded core 1 may be subjected to surface insulation treatment. When the soft magnetic material powder is subjected to surface insulation treatment, a tendency of improving the insulation resistance of the compression molded core 1 is observed. The type of the surface insulation treatment to be applied to the soft magnetic material powder is not limited, and examples thereof include phosphoric acid treatment, phosphate treatment, and oxidation treatment.

The rates of the weight of the first powder and the weight of the second powder included in the compression molded core 1 are not particularly limited, and the rate of the weight of the first powder to the sum of the weight of the first powder and the weight of the second powder may be preferably 30 mass % or more and 70 mass % or less.

(6) Binding Component

The compression molded core 1 may contain a binding component binding the powder of a crystalline magnetic material and the powder of an amorphous magnetic material to another material contained in the compression molded core 1. The composition of the binding component is not limited as long as the binding component is a material that contributes to fixing of the soft magnetic material powders (specifically, including the first powder and the second powder and may be collectively referred to as "magnetic powders" in the present specification) contained in the compression molded core 1 according to the present embodiment. Examples of the material constituting the binding component include organic materials, such as a resin material and a pyrolysis residue of a resin material (in the present specification, they are collectively referred to as "resin material-based component"), and inorganic materials. Examples of the resin material include an acrylic resin, a silicone resin, an epoxy resin, a phenolic resin, a urea resin, and a melamine resin. As the binding component consisting of an inorganic material, a glass material, such as water glass, is exemplified. The binding component may be constituted of one material or may be constituted of a plurality of materials. The binding component may be a mixture of an organic material and an inorganic material.

As the binding component, an insulating material is usually used. Consequently, the insulation as the compression molded core 1 can be increased.

2. Method for Manufacturing Compression Molded Core

Although the method for manufacturing the compression molded core 1 according to an embodiment of the present invention is not particularly limited, when the manufacturing method described below is employed, more efficient manufacturing of the compression molded core 1 is realized.

The method for manufacturing the compression molded core 1 according to an embodiment of the present invention includes a molding step which will be described below and may further include a heat treatment step.

(1) Molding Step

First, a mixture including magnetic powders and a component providing a binding component in a compression molded core 1 are prepared. The component providing a binding component (in the present specification, also referred to as a "binder component") may be the binding component itself or may be a material different from the binding component. In an example of the latter, the binder component is a resin material, and the binding component is a pyrolysis residue thereof. This pyrolysis residue is formed, as described below, in a heat treatment step which is performed subsequently after a molding step.

A molded product can be obtained by the molding process including pressure molding of the mixture. The pressurizing conditions are not limited and are appropriately set based on, for example, the composition of the binder component. For example, when the binder component consists of a thermosetting resin, it is preferable to allow the curing reaction of the resin to proceed in a die by heating while pressurizing. In contrast, in compression molding, although the welding pressure is high, heating is not an essential requirement, and the pressurization is performed for a short time. The welding pressure for compression molding is appropriately set. In an example without limitation, the welding pressure may be 0.5 GPa or more and 2 GPa or less and preferably 1 GPa or more and 2 GPa or less.

A case in which the mixture is a granulated powder and compression molding is performed will now be described in a little more detail. Since a granulated powder is excellent in handleability, the workability of the compression molding step in which the molding time is short and the productivity is excellent can be improved.

(1-1) Granulated Powder

The granulated powder contains magnetic powders and a binder component. The content of the binder component in the granulated powder is not particularly limited. When the content is too low, the binder component is unlikely to hold the magnetic powders. In addition, when the content of the binder component is too low, in the compression molded core 1 obtained through a heat treatment step, the binding component consisting of the pyrolysis residue of the binder component is unlikely to insulate the plurality of magnetic powders from each other. In contrast, when the content of the binder component is too high, the content of the binding component contained in the compression molded core 1 obtained through the heat treatment step tends to increase. If the content of the binding component in the compression molded core 1 is increased, the magnetic properties of the compression molded core 1 tend to be decreased. Accordingly, the content of the binder component in the granulated powder is preferably adjusted to 0.5 mass % or more and 5.0 mass % or less based on the whole mass of the granulated powder. From the viewpoint of more stably reducing the risk of a reduction in the magnetic properties of the compression molded core 1, the content of the binder component in the granulated powder is preferably 1.0 mass % or more and 3.5 mass % or less and more preferably 1.2 mass % or more and 3.0 mass % or less based on the whole mass of the granulated powder.

The granulated powder may contain a material other than the magnetic powders and the binder component. Examples of the material include a lubricant, a silane coupling agent, and an insulating filler. When a lubricant is contained, the type thereof is not particularly limited and may be an organic lubricant or may be an inorganic lubricant. Examples of the organic lubricant include metal soap, such as zinc stearate and aluminum stearate. It is inferred that such an organic lubricant vaporizes in the heat treatment step and does not substantially remain in the compression molded core 1.

The method for manufacturing the granulated powder is not particularly limited. The granulated powder may be prepared by directly kneading the above-mentioned components providing the granulated powder and pulverizing the resulting kneaded product by a known method or may be prepared by adding a dispersion medium (an example thereof is water) to the above-mentioned components to prepare a slurry and drying and pulverizing the slurry. The particle size distribution of the granulated powder may be controlled by performing sieving or classification after pulverization.

Figure 2:
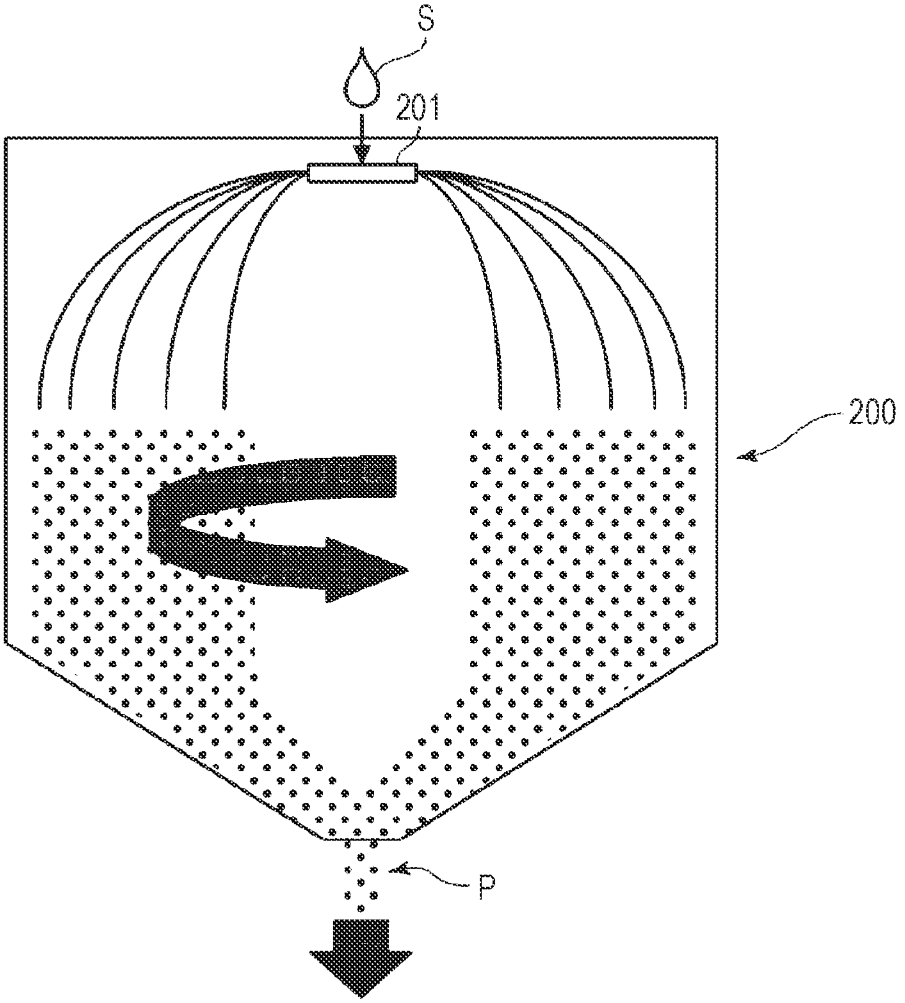
FIG. 2 PRIOR ART
FIG. 2 is a diagram conceptionally illustrating a spray dryer apparatus that is used in an example of a method manufacturing a granulated powder and the behavior thereof.

As an example of the method for obtaining the granulated powder from the slurry, a method using a spray dryer is mentioned. As shown in FIG. 2, a rotor 201 is provided in a spray dryer apparatus 200, and slurry S is injected from the upper part of the apparatus toward the rotor 201. The rotor 201 is rotating at a predetermined number of rotations, and the slurry S is sprayed as droplets by centrifugal force in the chamber inside the spray dryer apparatus 200. Furthermore, hot air is introduced into the chamber inside the spray dryer apparatus 200, thereby volatilizing the dispersion medium (water) contained in the slurry S in a droplet form while maintaining the droplet shape. Consequently, a granulated powder P is formed from the slurry S. This granulated powder P is collected from the lower part of the spray dryer apparatus 200. Each of the parameters, such as the number of rotations of the rotor 201, the temperature of the hot air to be introduced into the spray dryer apparatus 200, and the temperature of the chamber bottom, may be appropriately set. Examples of the ranges of setting these parameters include 4000 to 8000 rpm as the number of rotations of the rotor 201, 100° C. to 170° C. as the temperature of hot air to be introduced into the spray dryer apparatus 200, and 80° C. to 90° C. as the temperature of the chamber bottom. In addition, the atmosphere and the pressure in the chamber may also be appropriately set. As an example, the inside of the chamber is set to an air atmosphere with a differential pressure of 2 $mmH_2O$ (about 0.02 kPa) from the atmospheric pressure. The particle size distribution of the resulting granulated powder P may be further controlled by, for example, sieving.

(1-2) Pressurizing Condition

The pressurizing conditions in the compression molding are not particularly limited and may be appropriately set considering the composition of the granulated powder, the shape of the molded product, etc. When the welding pressure in the compression molding of the granulated powder is too low, the mechanical strength of the molded product decreases. Accordingly, problems, such as a decrease in the handleability of the molded product and a decrease in the mechanical strength of the compression molded core 1 obtained from the molded product, tend to occur. In addition, the compression molded core 1 may decrease its own magnetic properties or insulation. In contrast, when the welding pressure in the compression molding of the granulated powder is too high, it is difficult to produce a molding die that can withstand the pressure. From the viewpoint of more stably reducing the risk of adverse effect of the compression step on the mechanical characteristics and magnetic properties of the compression molded core 1 and easily performing industrial mass production, the welding pressure in compression molding of the granulated powder is preferably 0.3 GPa or more and 2 GPa or less, more preferably 0.5 GPa or more and 2 GPa or less, and particularly preferably 0.8 GPa or more and 2 GPa or less.

In the compression molding, the pressurization may be performed while heating or may be performed at ordinary temperature.

(2) Heat Treatment Step

The compression molded core 1 according to the present embodiment may be the molded product obtained by the molding step or may be, as described below, obtained by subjecting the molded product to a heat treatment step.

In the heat treatment step, the molded product obtained by the above-described molding step is heated to adjust the magnetic properties through amendment of the distance between magnetic powder particles and to adjust the magnetic properties through relief of the distortion applied to the magnetic powders during the molding step, thereby obtaining the compression molded core 1.

Since the heat treatment step is performed, as described above, for the purpose of adjusting the magnetic properties of the compression molded core 1, the heat treatment conditions, such as heat treatment temperature, are set so as to optimize the magnetic properties of the compression molded core 1. In an example of the method for setting the heat treatment conditions, the heating temperature of the molded product is changed, and other conditions, such as the temperature rising rate and the retention time at the heating temperature, are kept constant.

When the heating treatment conditions are set, the evaluation criterion of the magnetic properties of the compression molded core 1 is not particularly limited. An example of the evaluation item is the iron loss Pcv of the compression molded core 1. In this case, the heating temperature may be set so that the iron loss Pcv of the compression molded core 1 is minimum. The conditions for measuring the iron loss Pcv are appropriately set. As an example thereof, conditions of a frequency of 2 MHz and an effective maximum magnetic flux density Bm of 15 mT are mentioned.

The atmosphere in the heat treatment is not particularly limited. When it is an oxidizing atmosphere, since a risk of excessive proceeding of pyrolysis of the binder component and a risk of proceeding of oxidation of the magnetic powders are increased, it is preferable to perform the heat treatment in an inert atmosphere of, for example, nitrogen or argon or in a reducing atmosphere of, for example, hydrogen. When the binder component is formed of a resin material, this binder component may become a pyrolysis residue by heat treatment as described above. It is inferred that the binder component is in a pyrolysis residue form when the distortion is relieved as described above.

3. Inductor and Electric/Electronic Equipment

The inductor according to an embodiment of the present invention includes the above-described compression molded core 1 according to an embodiment of the present invention, a coil, and connection terminals connected to each of the ends of the coil. Here, the compression molded core 1 is disposed so as to be at least partially located in an inductive magnetic field generated by a current when the current flows in the coil through the connection terminals. The inductor according to an embodiment of the present invention includes the compression molded core 1 according to an embodiment of the present invention and therefore has excellent direct-current superimposition characteristics and also excellent insulation characteristics and mechanical characteristics.

Figure 3:
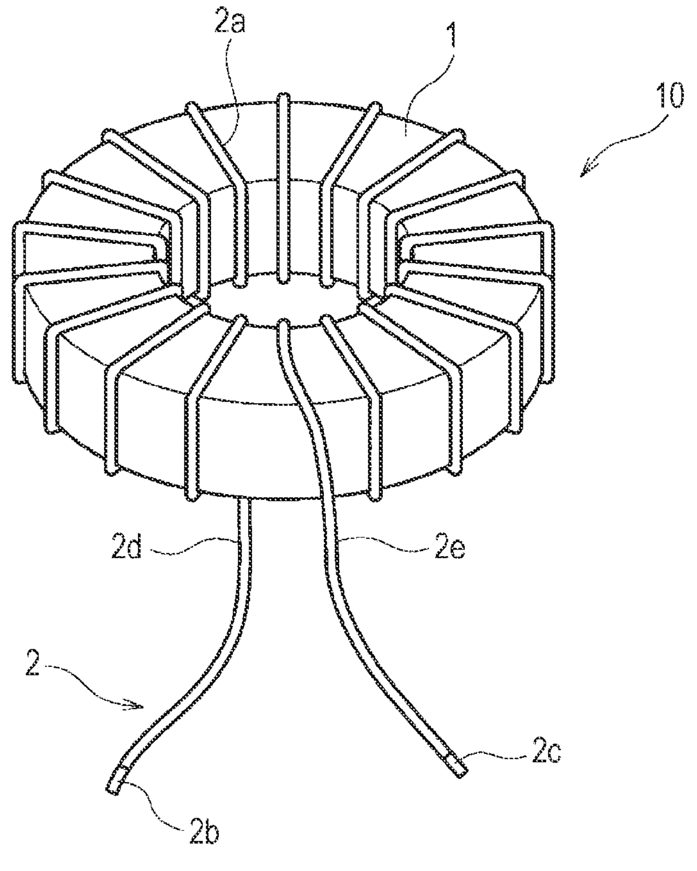
FIG. 3 is a perspective view conceptionally illustrating a shape of a toroidal coil as an inductor including a compression molded core according to an embodiment of the present invention.

As an example of the inductor, the toroidal coil 10 shown in FIG. 3 is mentioned. The toroidal coil 10 includes a coil **2*a* formed by winding coated conductive wire 2 around a ring-shaped compression molded core (toroidal core) 1. The ends 2***d* and 2*e* of the coil 2*a* can be defined by the parts of the conductive wire located between the coil 2*a* consisting of the wound coated conductive wire 2 and the ends 2*b* and 2*c*, respectively, of the coated conductive wire 2. Thus, in the inductor according to the present embodiment, the member constituting the coil and the member constituting the connection terminals may be constituted of the same member.

Figure 4:
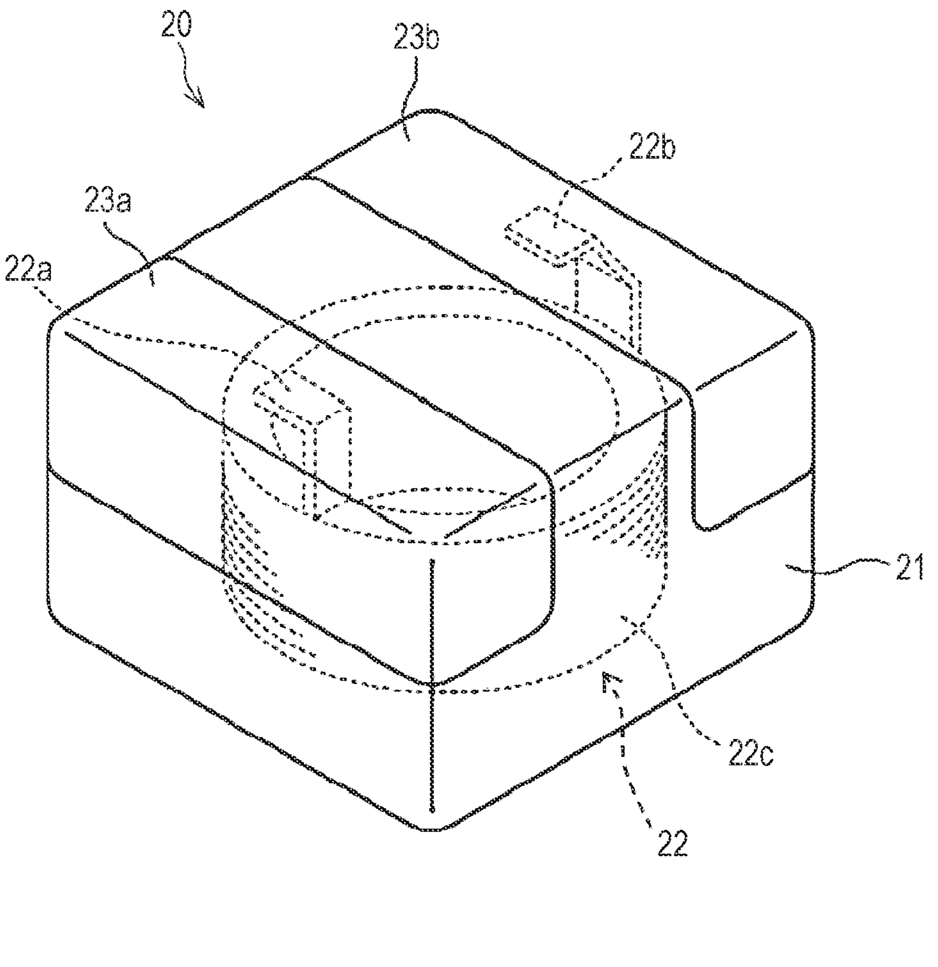
FIG. 4 is a perspective view conceptionally illustrating a shape of a coil-embedded inductor as an inductor including a compression molded core according to an embodiment of the present invention.

As another example of the inductor according to an embodiment of the present invention, the coil-embedded inductor 20 shown in FIG. 4 is mentioned. The coil-embedded inductor 20 can be formed into a small chip having a size of several mm square and includes a compression molded core 21 having a box-type shape, and a coil portion 22*c* of the coated conductive wire 22 is embedded inside the compression molded core 21. The ends 22*a* and 22*b* of the coated conductive wire 22 are located and exposed on the surface of the compression molded core 21. The surface of the compression molded core 21 is partially covered by connection ends 23*a* and 23*b* that are electrically independent from each other. The connection end 23*a* is electrically connected to the end 22*a* of the coated conductive wire 22, and the connection end 23*b* is electrically connected to the end 22*b* of the coated conductive wire 22. In the coil-embedded inductor 20 shown in FIG. 4, the end 22*a* of the coated conductive wire 22 is covered by the connection end 23*a*, and the end 22*b* of the coated conductive wire 22 is covered by the connection end 23*b*.

The method for embedding the coil portion 22*c* of the coated conductive wire 22 in the compression molded core 21 is not limited. The pressure molding may be performed by placing a member around which the coated conductive wire 22 is wound in a die and further supplying a mixture (granulated powder) including magnetic powders to the die. Alternatively, a plurality of members is prepared by pre-molding a mixture (granulated powder) including magnetic powders in advance, these members are combined, and coated conductive wire 22 is disposed in the vacant space formed when the members are combined to obtain an assembly, and this assembly may be pressure-molded. The material of the coated conductive wire 22 including the coil portion 22*c* is not limited, and examples thereof include a copper alloy. The coil portion 22*c* may be an edgewise coil. The materials of the connection ends 23*a* and 23*b* are not limited. From the viewpoint of its excellent productivity, it may be preferable to include a metallized layer formed from a conductive paste, such as silver paste, and a plating layer formed on the metallized layer. The material forming this plating layer is not limited. Examples of the metal element contained in the material include copper, aluminum, zinc, nickel, iron, and tin.

The electric/electronic equipment according to an embodiment of the present invention is electric/electronic equipment mounted with the inductor according to an embodiment of the present invention, and the inductor is connected to a substrate with the connection terminals thereof. As an example of a circuit including the inductor, a switching power supply circuit, such as a DC-DC converter, is mentioned. The switching power supply circuit tends to use a high switching frequency and to increase the amperage flowing in the circuit for corresponding to various demands, such as miniaturization, weight reduction, and high functionality of the electric/electronic equipment. Accordingly, also in the current flowing in the inductor as a component of the circuit, the fluctuation frequency and the average amperage tend to increase. Regarding this point, as described above, even if the inductor including the compression molded core according to an embodiment of the present invention is small-sized, appropriate behavior in a high magnetic field environment is possible. Moreover, since the core loss of the inductor according to an embodiment of the present invention is low, in a switching power supply circuit including the inductor, a reduction in efficiency is suppressed, and a problem of heat generation is unlikely to occur. Thus, the electric/electronic equipment mounted with the inductor according to an embodiment of the present invention can realize high functionality while corresponding to miniaturization and weight reduction.

The embodiments described above have been described for facilitating the understanding the present invention and are not described for limiting the present invention. Accordingly, each element disclosed in the embodiments is intended to also include all changes in design and equivalents belonging to the technical scope of the present invention. In the present embodiment, the powders of the soft magnetic materials included in the compression molded core are two types, a first powder and a second powder, but are not limited thereto, and the compression molded core may contain three or more types of powders. In this case, the powder having a maximum median diameter is defined as a first powder, and the powder having a minimum median diameter is defined as a second powder. In addition, when the compression molded core contains three or more powders, the powder other than the first powder and the second powder may have any organization without limitation and may be a powder of an amorphous magnetic material or may be a powder of a crystalline magnetic material. The specific composition of the powder other than the first powder and the second powder may also be different from both the composition of the soft magnetic material of the first powder and the composition of the magnetic material of the second powder, or may be equal to the composition of the soft magnetic material of the first powder or the composition of the magnetic material of the second powder.

EXAMPLES

The present invention will now be described further specifically by way of examples, but the scope of the present invention is not limited by these examples.

Example 1

(1) Preparation of Magnetic Powder

Four types (Fe-50% Ni Nos. 1 to 4) of powders (crystalline powders) of crystalline magnetic materials each consisting of an Fe—Ni alloy containing 50 mass % of Ni were prepared (commercial products). Some of the prepared crystalline powders were subjected to surface insulation treatment as shown in Table 1.

Four types (Fe-3.5Si-4.5Cr material Nos. 1 to 4) of crystalline powders (crystalline powders) each consisting of an Fe—Si—Cr alloy containing 3.5 mass % of Si and 4.5 mass % of Cr were prepared (commercial products). Some of the prepared crystalline powders were subjected to surface insulation treatment as shown in Table 1.

One commercially available carbonyl iron powder (Fe No. 1) was prepared.

The following commercially available two powders (amorphous powders) of amorphous magnetic materials were prepared.

Amorphous Nos. 1 and 2: Fe—Si—B—Cr alloys

Materials were weighed so as to give a predetermined composition including Fe, Ni, Cr, P, C, and B as elements and were smelted to an Fe—P—C alloy, and an amorphous magnetic material powder (amorphous powder) was produced from the obtained Fe—P—C alloy by a water atomization method. The obtained amorphous magnetic material powder was classified to prepare amorphous powders (amorphous Nos. 3 to 8) having different particle size distributions.

As a soft magnetic powder (nanocrystalline powder) consisting of a nanocrystalline material, an Fe—Si—B—Nb—Cu alloy was prepared (fine crystal material No. 1).

The volume-based particle size distributions of the prepared crystalline powders, amorphous powders, and nanocrystalline powder were measured with "Microtrac particle size distribution analyzer MT3300EX" manufactured by Nikkiso Co., Ltd. In the volume-based particle size distributions, the particle sizes at which the integrated particle diameter distribution from the small particle size side was 50% (amorphous powder median diameter) were values shown in Table 1.

TABLE 1

| Powder name | Description | Median dimeter (μm) |
|---|---|---|
| Fe-50% Ni No.1 | Presence of surface insulation treatment | 4.42 |
| Fe-50% Ni No.2 | Presence of surface insulation treatment | 4.3 |
| Fe-50% Ni No.3 | Absence of surface insulation treatment | 4.25 |
| Fe-50% Ni No.4 | Absence of surface insulation treatment | 9.63 |
| Fe-3.5Si-4.5Cr material No.1 | Presence of surface insulation treatment | 4.16 |
| Fe-3.5Si-4.5Cr material No.2 | Absence of surface insulation treatment | 4.19 |
| Fe-3.5Si-4.5Cr material No.3 | Presence of surface insulation treatment | 3.4 |
| Fe-3.5Si-4.5Cr material No.4 | Absence of surface insulation treatment | 2.38 |
| Fe No.1 | Carbonyl iron | 5 |
| Amorphous No.1 | Fe—Si—B—Cr alloy | 5 |
| Amorphous No.2 | Fe—Si—B—Cr alloy | 23.61 |
| Amorphous No.3 | Fe—P—C alloy | 4.7 |
| Amorphous No.4 | Fe—P—C alloy | 5.5 |
| Amorphous No.5 | Fe—P—C alloy | 5.7 |
| Amorphous No.6 | Fe—P—C alloy | 6.5 |
| Amorphous No.7 | Fe—P—C alloy | 6.7 |
| Amorphous No.8 | Fe—P—C alloy | 11 |
| Fine crystal material No.1 | Fe—Si—B—Nb—Cu alloy | 27.78 |

(2) Production of Granulated Powder

As shown in Tables 2 and 3, two powders were selected from the above-described crystalline powders, amorphous powders, and nanocrystalline powder, one having a larger median diameter was defined as a first powder, and the other was defined as a second powder. These powders were mixed at the ratios shown in Tables 2 and 3 to prepare mixture powders. Incidentally, in Tables 2 and 3, the rate of the weight of the first powder to the sum of the weight of the first powder and the weight of the second powder (weight of the mixture powder) was defined as a first rate R1, and the rate of the weight of the second powder to the weight of the mixture powder was defined as a second rate R2.

TABLE 2

| | First powder | | Second powder | |
|---|---|---|---|---|
| Experiment example | First material | First rate R1 | Second material | Second rate R2 |
| Comparative Example 1 | Fe-50% Ni No.1 | 0.3 | Fe—3.5Si—4.5Cr material No.1 | 0.7 |
| Comparative Example 2 | Fe-50% Ni No.1 | 0.6 | Fe—3.5Si—4.5Cr material No.1 | 0.4 |
| Comparative Example 3 | Amorphous material No.3 | 0.6 | Fe—3.5Si—4.5Cr material No.1 | 0.4 |

TABLE 2-continued

| | First powder | | Second powder | |
|---|---|---|---|---|
| Experiment example | First material | First rate R1 | Second material | Second rate R2 |
| Example 1 | Amorphous material No.4 | 0.4 | Fe—3.5Si—4.5Cr material No.1 | 0.6 |
| Example 2 | Amorphous material No.4 | 0.5 | Fe—3.5Si—4.5Cr material No.1 | 0.5 |
| Example 3 | Amorphous material No.4 | 0.5 | Fe—3.5Si—4.5Cr material No.1 | 0.5 |
| Example 4 | Amorphous material No.4 | 0.5 | Fe—3.5Si—4.5Cr material No.1 | 0.5 |
| Example 5 | Amorphous material No.5 | 0.6 | Fe-50% Ni No.2 | 0.4 |
| Example 6 | Amorphous material No.5 | 0.6 | Fe-50% Ni No.2 | 0.4 |
| Example 7 | Amorphous material No.4 | 0.6 | Fe—3.5Si—4.5Cr material No.1 | 0.4 |
| Example 8 | Amorphous material No.4 | 0.6 | Fe—3.5Si—4.5Cr material No.1 | 0.4 |
| Example 9 | Amorphous material No.4 | 0.3 | Fe—3.5Si—4.5Cr material No.1 | 0.7 |
| Example 10 | Amorphous material No.4 | 0.3 | Fe—3.5Si—4.5Cr material No.1 | 0.7 |
| Example 11 | Amorphous material No.4 | 0.7 | Fe—3.5Si—4.5Cr material No.2 | 0.3 |
| Example 12 | Amorphous material No.6 | 0.3 | Fe—3.5Si—4.5Cr material No.3 | 0.7 |
| Example 13 | Amorphous material No.6 | 0.3 | Fe—3.5Si—4.5Cr material No.1 | 0.7 |
| Example 14 | Amorphous material No.6 | 0.3 | Fe—3.5Si—4.5Cr material No.2 | 0.7 |
| Example 16 | Amorphous material No.6 | 0.3 | Fe-50% Ni No.3 | 0.7 |
| Example 17 | Amorphous material No.5 | 0.7 | Fe—3.5Si—4.5Cr material No.3 | 0.3 |
| Example 18 | Amorphous material No.5 | 0.7 | Fe—3.5Si—4.5Cr material No.3 | 0.3 |
| Example 19 | Amorphous material No.4 | 0.6 | Fe—3.5Si—4.5Cr material No.3 | 0.4 |
| Example 20 | Amorphous material No.4 | 0.6 | Fe—3.5Si—4.5Cr material No.3 | 0.4 |
| Example 21 | Amorphous material No.6 | 0.3 | Fe-50% Ni No.1 | 0.7 |
| Example 22 | Amorphous material No.6 | 0.6 | Fe—3.5Si—4.5Cr material No.3 | 0.4 |
| Example 23 | Amorphous material No.6 | 0.6 | Fe—3.5Si—4.5Cr material No.1 | 0.4 |

TABLE 3

| | First powder | | Second powder | |
|---|---|---|---|---|
| Experiment example | First material | First rate R1 | Second material | Second rate R2 |
| Example 24 | Amorphous material No.6 | 0.6 | Fe—3.5Si—4.5Cr material No.2 | 0.4 |
| Example 25 | Amorphous material No.6 | 0.6 | Fe—2Si—3Cr material No.1 | 0.4 |
| Example 26 | Amorphous material No.6 | 0.6 | Fe-50% Ni No.3 | 0.4 |
| Example 27 | Amorphous material No.7 | 0.6 | Fe—3.5Si—4.5Cr material No.1 | 0.4 |
| Comparative Example 4 | Amorphous material No.6 | 0.6 | Fe No.1 | 0.4 |
| Comparative Example 5 | Amorphous material No.8 | 0.3 | Fe—3.5Si—4.5Cr material No.1 | 0.7 |
| Comparative Example 6 | Amorphous material No.8 | 0.3 | Fe-50% Ni No.1 | 0.7 |
| Comparative Example 7 | Amorphous material No.8 | 0.3 | Fe No.1 | 0.7 |
| Comparative Example 8 | Fe-50% Ni No.4 | 0.6 | Fe—3.5Si—4.5Cr material No.1 | 0.4 |
| Comparative Example 10 | Amorphous material No.8 | 0.6 | Fe-50% Ni No.1 | 0.4 |
| Comparative Example 11 | Amorphous material No.8 | 0.6 | Fe No.1 | 0.4 |
| Comparative Example 12 | Amorphous material No.2 | 0.3 | Fe—3.5Si—4.5Cr material No.1 | 0.7 |
| Comparative Example 13 | Amorphous material No.2 | 0.3 | Fe No.1 | 0.7 |
| Comparative Example 14 | Amorphous material No.2 | 0.3 | Amorphous material No.1 | 0.7 |
| Comparative Example 15 | Fine crystal material No.1 | 0.3 | Fe No.1 | 0.7 |
| Comparative Example 16 | Amorphous material No.2 | 0.6 | Fe—3.5Si—4.5Cr material No.1 | 0.4 |
| Comparative Example 17 | Amorphous material No.2 | 0.6 | Fe No.1 | 0.4 |
| Comparative Example 18 | Amorphous material No.2 | 0.6 | Amorphous material No.1 | 0.4 |
| Comparative Example 19 | Fine crystal material No.1 | 0.6 | Fe No.1 | 0.4 |

TABLE 3-continued

| Experiment example | First powder: First material | First powder: First rate R1 | Second powder: Second material | Second powder: Second rate R2 |
|---|---|---|---|---|
| Comparative Example 20 | Fe-50% Ni No.4 | 0.3 | Fe—3.5Si—4.5Cr material No.1 | 0.7 |
| Comparative Example 21 | Amorphous material No.6 | 0.3 | Fe No.1 | 0.7 |
| Example 28 | Amorphous material No.4 | 0.6 | Fe—3.5Si—4.5Cr material No.4 | 0.4 |
| Example 29 | Amorphous material No.5 | 0.6 | Fe—3.5Si—4.5Cr material No.3 | 0.4 |

Each slurry was prepared by mixing 2 to 3 parts by mass of an insulating binding material consisting of an acrylic resin and a phenolic resin and 0 to 0.5 parts by mass of a lubricant consisting of zinc stearate with 100 parts by mass of the obtained mixture powder and further using water as a solvent.

Each of the obtained slurry was granulated under the conditions described above with a spray dryer apparatus 200 shown in FIG. 2 to obtain a granulated powder.

(3) Compression Molding

The obtained granulated powder was filled in a die and was pressure-molded at a surface pressure of 980 MPa to obtain a molded product in a ring-like shape having an outer diameter of 20 mm, an inner diameter of 12 mm, and a thickness of 3 mm (4) Heat Treatment The obtained molded product was placed in a furnace with a nitrogen gas flow atmosphere and was subjected to heat treatment by increasing the furnace temperature from room temperature (23° C.) to an optimum core-heating treatment temperature, 200° C. to 500° C., at a temperature rising rate of 10° C./min, maintaining this temperature for 1 hour, and then cooling to room temperature in the furnace to obtain a toroidal core consisting of the compression molded core 1.

The first median diameter D1, the second median diameter D2, and two parameters derived therefrom ([D1−D2)/D1] and average median diameter) of each of the obtained toroidal cores are collectively shown in Tables 4 and 5. Incidentally, the average median diameter DT was determined by D1×R1+D2×R2. In addition, whether each of the obtained toroidal cores (compression molded core 1) satisfied the first to third requirements or not was verified from the thus-obtained numerical values relating to the median diameter, and the results are shown in the column "Requirement". In the column "Requirement", "1" means that the first requirement was satisfied, "2" means that the second requirement was satisfied, and "2, 3" means that the second requirement and the third requirement were satisfied. When an obtained toroidal core (compression molded core 1) did not satisfy all of the first to third requirements, "0" was entered in the column of "Requirement".

TABLE 4

| Experiment example | Median dimeter (μm) D1 | Median dimeter (μm) D2 | (D1-D2)/D1 | Average median diameter DT (μm) | Requirement |
|---|---|---|---|---|---|
| Comparative Example 1 | 4.42 | 4.16 | 0.059 | 4.24 | 0 |
| Comparative Example 2 | 4.42 | 4.16 | 0.059 | 4.32 | 0 |
| Comparative Example 3 | 4.7 | 4.16 | 0.115 | 4.48 | 0 |
| Example 1 | 5.5 | 4.16 | 0.244 | 4.70 | 1 |
| Example 2 | 5.5 | 4.16 | 0.244 | 4.83 | 1 |
| Example 3 | 5.5 | 4.16 | 0.244 | 4.83 | 1 |
| Example 4 | 5.5 | 4.16 | 0.244 | 4.83 | 1 |
| Example 5 | 5.7 | 4.3 | 0.246 | 5.14 | 1 |
| Example 6 | 5.7 | 4.3 | 0.246 | 5.14 | 1 |
| Example 7 | 5.5 | 4.16 | 0.244 | 4.96 | 1 |
| Example 8 | 5.5 | 4.16 | 0.244 | 4.96 | 1 |
| Example 9 | 5.5 | 4.16 | 0.244 | 4.56 | 1 |
| Example 10 | 5.5 | 4.16 | 0.244 | 4.56 | 1 |
| Example 11 | 5.5 | 4.19 | 0.238 | 5.11 | 1 |
| Example 12 | 6.5 | 3.4 | 0.477 | 4.33 | 2.3 |
| Example 13 | 6.5 | 4.16 | 0.360 | 4.86 | 2 |
| Example 14 | 6.5 | 4.19 | 0.355 | 4.88 | 2 |
| Example 16 | 6.5 | 4.25 | 0.346 | 4.93 | 2 |
| Example 17 | 5.7 | 3.4 | 0.404 | 5.01 | 2.3 |
| Example 18 | 5.7 | 3.4 | 0.404 | 5.01 | 2.3 |
| Example 19 | 5.5 | 3.4 | 0.382 | 4.66 | 2.3 |
| Example 20 | 5.5 | 3.4 | 0.382 | 4.66 | 2.3 |
| Example 21 | 6.5 | 4.42 | 0.320 | 5.04 | 2 |
| Example 22 | 6.7 | 3.4 | 0.493 | 5.38 | 2.3 |
| Example 23 | 6.5 | 4.16 | 0.360 | 5.56 | 2 |

TABLE 5

| Experiment example | Median dimeter (μm) D1 | D2 | (D1-D2)/D1 | Average median diameter DT (μm) | Requirement |
|---|---|---|---|---|---|
| Example 24 | 6.5 | 4.19 | 0.355 | 5.58 | 2 |
| Example 25 | 6.5 | 4.21 | 0.352 | 5.58 | 2 |
| Example 26 | 6.5 | 4.25 | 0.346 | 5.60 | 2 |
| Example 27 | 6.7 | 4.16 | 0.379 | 5.68 | 2 |
| Comparative Example 4 | 6.5 | 5 | 0.231 | 5.90 | 0 |
| Comparative Example 5 | 11 | 4.16 | 0.622 | 6.21 | 0 |
| Comparative Example 6 | 11 | 4.42 | 0.598 | 6.39 | 0 |
| Comparative Example 7 | 11 | 5 | 0.545 | 6.80 | 0 |
| Comparative Example 8 | 9.63 | 4.16 | 0.568 | 7.44 | 0 |
| Comparative Example 10 | 11 | 4.42 | 0.598 | 8.37 | 0 |
| Comparative Example 11 | 11 | 5 | 0.545 | 8.60 | 0 |
| Comparative Example 12 | 23.61 | 4.16 | 0.824 | 10.00 | 0 |
| Comparative Example 13 | 23.61 | 5 | 0.788 | 10.58 | 0 |
| Comparative Example 14 | 23.61 | 5 | 0.788 | 10.58 | 0 |
| Comparative Example 15 | 27.78 | 5 | 0.820 | 11.83 | 0 |
| Comparative Example 16 | 23.61 | 4.16 | 0.824 | 15.83 | 0 |
| Comparative Example 17 | 23.61 | 5 | 0.788 | 16.17 | 0 |
| Comparative Example 18 | 23.61 | 5 | 0.788 | 16.17 | 0 |
| Comparative Example 19 | 27.78 | 5 | 0.820 | 18.67 | 0 |
| Comparative Example 20 | 9.63 | 4.16 | 0.568 | 5.80 | 0 |
| Comparative Example 21 | 6.5 | 5 | 0.231 | 5.45 | 0 |
| Example 28 | 5.5 | 2.38 | 0.567 | 4.25 | 2.3 |
| Example 29 | 5.7 | 3.4 | 0.404 | 4.78 | 2.3 |

Test Example 1: Measurement of μ(0)

The initial permeability μ(0) of a toroidal coil obtained by winding coated copper wire around each of the toroidal cores produced in Examples and Comparative Examples 40 times on the primary side and 10 times on the secondary side was measured under a condition of 1 MHz with an impedance analyzer ("4192A", manufactured by Hewlett-Packard Company). The results of the measurement are shown in Tables 6 and 7.

Test Example 2

Measurement of μ(8) A direct current was superimposed under a condition of 1 MHz using each of the toroidal coils produced in Examples and Comparative Examples, and the relative magnetic permeability μ(8) when the inductive magnetic field of the superimposed direct current was 8 kA/m was measured. The results of the measurement are shown in Tables 6 and 7.

Test Example 3: Measurement of Iron Loss Pcv

The iron loss Pcv (unit: $kW/m^3$) of a toroidal coil obtained by winding coated copper wire around each of the toroidal cores produced in Examples and Comparative Examples 15 times on the primary side and 10 times on the secondary side was measured using a BH analyzer ("SY-8217", manufactured by IWATSU Electric Co., Ltd.) under a condition of an effective maximum magnetic flux density Bm of 15 mT at a measurement frequency of 2 MHz. The results of the measurement are shown in Tables 6 and 7.

Evaluation Example 1: μ(0)×μ(8)/Pcv

Based on the results measured in Test Examples 1 to 3, P1=μ(0)×μ(8)/Pcv (unit: $kW^{-1}m^3$) was calculated. The results of the calculation are shown in Tables 6 and 7.

TABLE 6

| Experiment example | Pcv ($kW/m^3$) | μ(0) | μ(8) | P1 ($kW^{-1}m^3$) | P1c ($kW^{-1}m^3$) First powder | Second powder | Mixture powder | Increase or decrease amount P1-P1c |
|---|---|---|---|---|---|---|---|---|
| Comparative Example 1 | 407 | 29.6 | 25.1 | 1.83 | 2.70 | 1.79 | 2.07 | −0.238 |
| Comparative Example 2 | 386 | 31.1 | 25.6 | 2.07 | 2.70 | 1.79 | 2.34 | −0.269 |
| Comparative Example 3 | 225 | 28.3 | 24.0 | 3.02 | 1.73 | 1.79 | 1.76 | 1.267 |
| Example 1 | 247 | 32.9 | 26.5 | 3.53 | 3.78 | 1.79 | 2.59 | 0.941 |
| Example 2 | 195 | 32.3 | 25.6 | 4.25 | 3.78 | 1.79 | 2.79 | 1.464 |
| Example 3 | 205 | 32.8 | 25.8 | 4.11 | 3.78 | 1.79 | 2.79 | 1.323 |
| Example 4 | 199 | 30.7 | 24.7 | 3.81 | 3.78 | 1.79 | 2.79 | 1.025 |
| Example 5 | 233 | 33.7 | 25.7 | 3.72 | 3.78 | 2.70 | 3.35 | 0.371 |

TABLE 6-continued

| Experiment example | Pcv (kW/m^3) | μ(0) | μ(8) | P1 ($kW^{-1}m^3$) | P1c ($kW^{-1}m^3$) First powder | Second powder | Mixture powder | Increase or decrease amount P1-P1c |
|---|---|---|---|---|---|---|---|---|
| Example 6 | 244 | 33.7 | 25.7 | 3.54 | 3.88 | 2.70 | 3.41 | 0.133 |
| Example 7 | 157 | 32.2 | 24.6 | 5.03 | 3.78 | 1.79 | 2.99 | 2.043 |
| Example 8 | 169 | 32.2 | 24.6 | 4.68 | 3.78 | 1.79 | 2.98 | 1.693 |
| Example 9 | 264 | 32.3 | 26.2 | 3.21 | 3.78 | 1.79 | 2.39 | 0.818 |
| Example 10 | 262 | 32.3 | 26.2 | 3.24 | 3.78 | 1.79 | 2.39 | 0.846 |
| Example 11 | 165 | 33.6 | 23.6 | 4.80 | 3.78 | 2.63 | 3.44 | 1.362 |
| Example 12 | 208 | 28.5 | 24.8 | 3.39 | 3.06 | — | — | — |
| Example 13 | 264 | 33.5 | 26.9 | 3.41 | 3.06 | 1.79 | 2.18 | 1.233 |
| Example 14 | 258 | 37.6 | 26.6 | 3.87 | 3.06 | 2.63 | 2.76 | 1.113 |
| Example 16 | 281 | 44.2 | 29.4 | 4.62 | 3.06 | 3.26 | 3.20 | 1.414 |
| Example 17 | 103 | 31.7 | 24.1 | 7.39 | 3.78 | — | — | — |
| Example 18 | 95 | 31.8 | 24.1 | 8.05 | 3.78 | — | — | — |
| Example 19 | 113 | 30.8 | 24.7 | 6.72 | — | — | — | — |
| Example 20 | 111 | 30.8 | 24.7 | 6.86 | 3.78 | — | — | — |
| Example 21 | 297 | 37.7 | 27.7 | 3.51 | 3.06 | 2.70 | 2.81 | 0.702 |
| Example 22 | 135 | 31.4 | 24.7 | 5.75 | 3.06 | — | — | — |
| Example 23 | 193 | 34.6 | 25.3 | 4.54 | 3.06 | 1.79 | 2.56 | 1.984 |

TABLE 7

| Experiment example | Pcv (kW/m^3) | μ(0) | μ(8) | P1 ($kW^{-1}m^3$) | P1c ($kW^{-1}m^3$) First powder | Second powder | Mixture powder | Increase or decrease amount P1-P1c |
|---|---|---|---|---|---|---|---|---|
| Example 24 | 250 | 38.9 | 26.1 | 4.06 | 3.06 | 2.63 | 2.89 | 1.173 |
| Example 25 | 193 | 35.5 | 26.1 | 4.80 | 3.06 | — | — | — |
| Example 26 | 249 | 43.2 | 26.6 | 4.62 | 3.06 | 3.26 | 3.14 | 1.474 |
| Example 27 | 193 | 35.9 | 24.8 | 4.61 | 3.06 | 1.79 | 2.56 | 2.052 |
| Comparative Example 4 | 396 | 38.7 | 26.6 | 2.60 | 3.06 | 1.16 | 2.30 | 0.294 |
| Comparative Example 5 | 362 | 35.2 | 26.7 | 2.60 | 1.46 | 1.79 | 1.69 | 0.901 |
| Comparative Example 6 | 577 | 40.1 | 27.3 | 1.90 | 1.46 | 2.70 | 2.33 | −0.428 |
| Comparative Example 7 | 634 | 40.5 | 29.7 | 1.90 | 1.46 | 1.16 | 1.25 | 0.649 |
| Comparative Example 8 | 585 | 37.3 | 27.1 | 1.73 | 1.34 | 1.79 | 1.52 | 0.206 |
| Comparative Example 10 | 627 | 43.4 | 26.7 | 1.85 | 1.46 | 2.70 | 1.95 | −0.105 |
| Comparative Example 11 | 479 | 42.2 | 27.2 | 2.40 | 1.46 | 1.16 | 1.34 | 1.060 |
| Comparative Example 12 | 648 | 36.8 | 28.8 | 1.64 | 0.60 | 1.79 | 1.44 | 0.199 |
| Comparative Example 13 | 859 | 40.6 | 31.8 | 1.50 | 0.60 | 1.16 | 0.99 | 0.510 |
| Comparative Example 14 | 477 | 22.2 | 19.1 | 0.89 | 0.60 | — | — | — |
| Comparative Example 15 | 779 | 40.5 | 31.1 | 1.62 | 0.44 | 1.16 | 0.95 | 0.671 |
| Comparative Example 16 | 850 | 41.5 | 30.2 | 1.47 | 0.60 | 1.79 | 1.08 | 0.394 |
| Comparative Example 17 | 835 | 40.2 | 30.4 | 1.46 | 0.60 | 1.16 | 0.83 | 0.637 |
| Comparative Example 18 | 569 | 26.6 | 21.7 | 1.02 | 0.60 | — | — | — |
| Comparative Example 19 | 845 | 37.4 | 29.2 | 1.29 | 0.44 | 1.16 | 0.73 | 0.562 |
| Comparative Example 20 | 518 | 32.7 | 26.1 | 1.64 | 1.34 | 1.79 | 1.66 | −0.013 |
| Comparative Example 21 | 579 | 40.0 | 30.6 | 2.12 | 3.06 | 1.16 | 1.73 | 0.384 |
| Example 28 | 116 | 35.2 | 26.7 | 8.13 | 3.78 | — | — | — |
| Example 29 | 126 | 31.4 | 25.0 | 6.23 | 3.88 | — | — | — |

Figure 5:
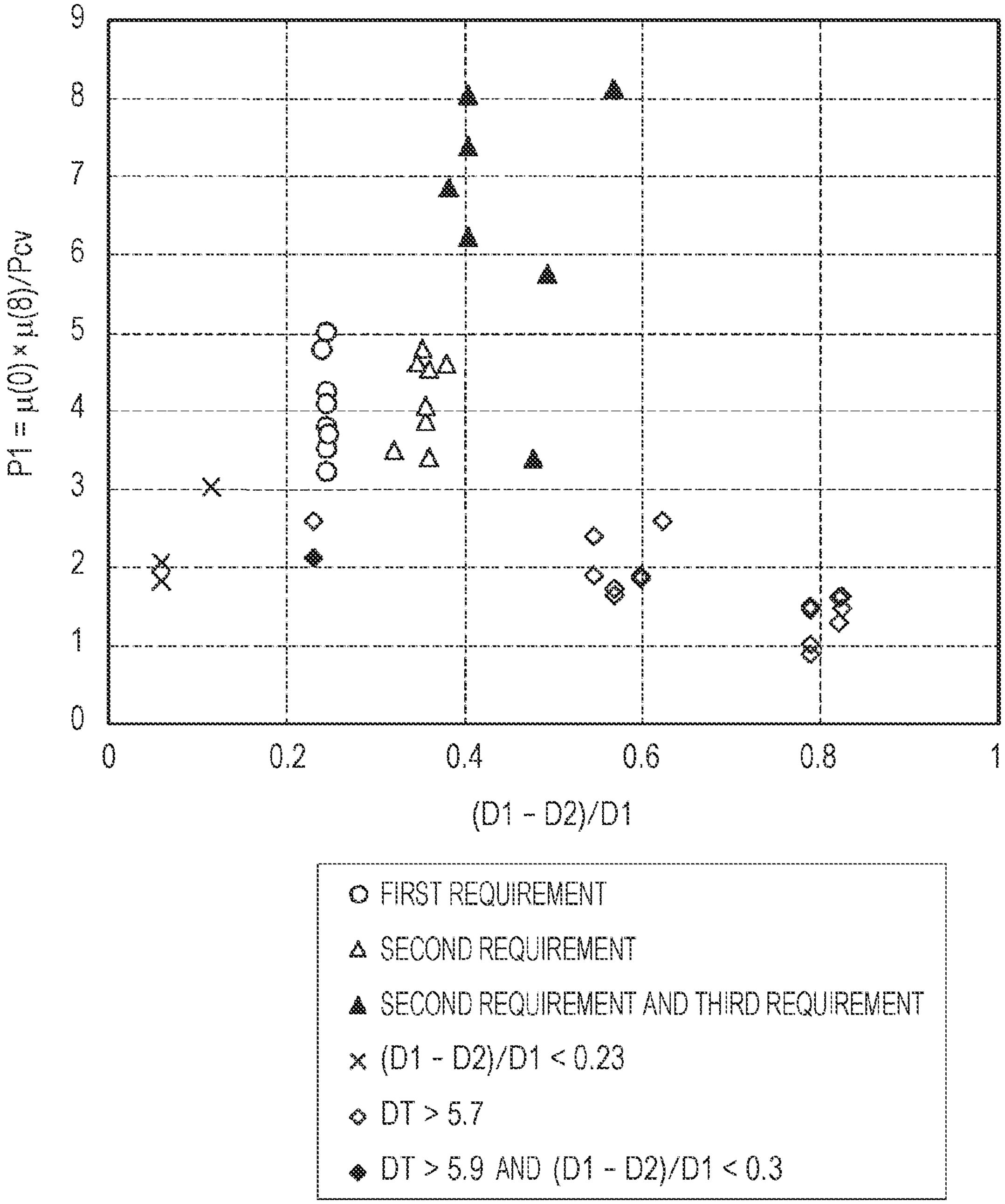
FIG. 5 is a graph showing the results of Examples and Comparative Examples.

FIG. 5 shows the results shown in Tables 6 and 7. FIG. 5 is a graph showing the results of Examples. In FIG. 5, the range of the result satisfying the first requirement ("○" in FIG. 5) was surrounded by a broken line, the range of the result satisfying the second requirement ("Δ" in FIG. 5) was surrounded by a dotted line, and the range of the result satisfying the second requirement and the third requirement ("▲" in FIG. 5) was surrounded by a solid line. As shown in Tables 6 and 7 and FIG. 5, it was confirmed that when the toroidal core of an Example according to the present invention was used, the P1 of the resulting toroidal coil (inductor) exceeded 3. In contrast, the P1 of each of the toroidal coils (inductors) according to Comparative Examples was 3 or less. Accordingly, it was confirmed that when the first to third requirements are satisfied, an inductor showing good magnetic properties even in a high magnetic field environment is obtained.

In Tables 6 and 7, in the column of Plc ($kW^{-1}m^3$), the calculation results of $\mu(0)\times\mu(8)/Pcv$ (unit: $kW^{-1}m^3$) based on the result of measurement of the first powder alone, $\mu(0)\times\mu(8)/Pcv$ (unit: $kW^{-1}m^3$) based on the result of measurement of the second powder alone, and $\mu(0)\times\mu(8)/Pcv$ (unit: $kW^{-1}m^3$) of the mixture powder determined from the results above and the mixture ratio thereof are shown. The formula for computation of Plc of a mixture powder is as follows:

$$P1c(\text{mixture powder})=P1c(\text{first powder})\times R1+P2c(\text{second powder})\times R2.$$

Incidentally, when there was no result of measurement of the first powder alone or the second powder alone, "-" is shown in the column of P1c of the measurement result of each powder alone and the mixture powder.

Tables 6 and 7 further show the results of calculation of P1−P1c (mixture powder) in the column of "Increase or decrease amount". As shown in Tables 6 and 7, in the toroidal coils (inductors) according to Examples, the increase or decrease amount tended to be a positive value and also was 2 or more in some cases. This means that a result of good magnetic properties that cannot be predicted from the simple arithmetic mean of the results of the powders was obtained in Examples. In the toroidal core (compression molded core 1) according to an Example, there is a possibility that the magnetic properties are improved due to a phenomenon of increasing the density of the magnetic powder caused by, for example, deformation in at least one of the first powder and the second powder. Incidentally, when there was no result of measurement of the P1c of a mixture powder, "-" is shown in the column of "Increase or decrease amount".

An inductor including the compression molded core of the present invention can be suitably used as an inductor that is a component of a switching power supply circuit, such as a DC-DC converter.

What is claimed is:

1. A compression molded core comprising a plurality of types of powders each formed of a soft magnetic material, wherein a median diameter of each powder is defined as a particle diameter at which an integrated particle diameter distribution becomes 50% when accumulated from a small particle size side based on a volume-based particle size distribution measured by a laser diffraction/scattering method, wherein the plurality of types of powders include:

a first powder made of an amorphous magnetic material and having a first median diameter D1 which is a greatest median diameter among the median diameters of the plurality of types of powders; and a second powder made of a crystalline magnetic material and having a second median diameter D2 which is a smallest median diameter among the median diameters of the plurality of types of powders, the second median diameter D2 being smaller than the first median diameter D1, wherein the first powder has a first weight ratio R1 which is a ratio of a weight of the first powder to a total weight of the first powder and the second powder in the compression molded core, while the second powder has a second weight ratio R2 which is a ratio of a weight of the second powder to the total weight of the first powder and the second powder in the compression molded core, an average median diameter DT being defined as DT=R1×D1+R2×D2, and wherein the second weight ratio R2, the first median diameter D1, the second median diameter D2, and the average median diameter DT satisfy following expressions (1) to (4):

$$0.4\leq R2\leq 0.7 \quad (1)$$

$$0.23\leq (D1-D2)/D1<0.3 \quad (2)$$

$$D1\leq 5.9\ \mu m \quad (3)$$

$$3\ \mu m\leq DT\leq 5.7\ \mu m \quad (4).$$

2. The compression molded core according to claim 1, wherein the amorphous magnetic material includes an Fe-based amorphous alloy containing at least Fe, P, and C.

3. The compression molded core according to claim 2, wherein the Fe-based amorphous alloy further contains at least Ni, B, and Cr.

4. The compression molded core according to claim 1, wherein the crystalline magnetic material includes at least one of an Fe—Si—Cr alloy and an Fe—Ni alloy.

5. The compression molded core according to claim 1, further comprising:

a binding component binding the first powder and the second powder to another material contained in the compression molded core.

6. The compression molded core according to claim 5, wherein the binding component includes a resin material-based component.

7. A method for manufacturing the compression molded core according to claim 6, the method comprising:

pressure molding a mixture including the first powder, the second powder, and the binder component, wherein the binder component consists of a resin material.

8. An inductor comprising the compression molded core according to claim 1, a coil, and connection terminals connected to each of ends of the coil, wherein the compression molded core is disposed so as to be at least partially located in an inductive magnetic field generated by a current when the current flows in the coil through the connection terminals.

9. The inductor according to claim 8, wherein an initial permeability μ(0) measured at a condition of 1 MHZ, a relative magnetic permeability μ(8) measured at a condition of 1 MHz when an external magnetic field is 8 kA/m, and an iron loss Pcv (unit: $kW/m^3$) measured at a condition of applying a magnetic field having an effective maximum magnetic flux density of 15 mT at a frequency of 2 MHz satisfy a following expression (I):

$$\mu(0)\times\mu(8)/Pcv>3.2\ kW^{-1}m^3 \quad (I).$$

10. Electric/electronic equipment mounted with the inductor according to claim 8, wherein the inductor is connected to a substrate with the connection terminals.

11. A compression molded core comprising a plurality of types of powders each formed of a soft magnetic material,
wherein a median diameter of each powder is defined as a particle diameter at which an integrated particle diameter distribution becomes 50% when accumulated from a small particle size side based on a volume-based particle size distribution measured by a laser diffraction/scattering method,
wherein the plurality of types of powders include:
a first powder made of an amorphous magnetic material and having a first median diameter D1 which is a greatest median diameter among the median diameters of the plurality of types of powders; and
a second powder made of a crystalline magnetic material and having a second median diameter D2 which is a smallest median diameter among the median diameters of the plurality of types of powders, the second median diameter D2 being smaller than the first median diameter D1,
wherein the first powder has a first weight ratio R1 which is a ratio of a weight of the first powder to a total weight of the first powder and the second powder in the compression molded core, while the second powder has a second weight ratio R2 which is a ratio of a weight of the second powder to the total weight of the first powder and the second powder in the compression molded core, an average median diameter DT being defined as DT=R1×D1+R2×D2,
and wherein the second weight ratio R2, the first median diameter D1, the second median diameter D2, and the average median diameter DT satisfy following expressions (1) to (5):

$$0.4 \leq R2 \leq 0.7 \quad (1)$$

$$0.3 \leq (D1-D2)/D1 \leq 0.59 \quad (2)$$

$$D1 \leq 7\ \mu m \quad (3)$$

$$3\ \mu m \leq DT \leq 5.7\ \mu m \quad (4)$$

$$D2 \leq 3.9\ \mu m \quad (5).$$

12. The compression molded core according to claim 11,
wherein the amorphous magnetic material includes an Fe-based amorphous alloy containing at least Fe, P, and C, and the crystalline magnetic material includes at least one of an Fe—Si—Cr alloy and an Fe—Ni alloy,
and wherein the compression molded core further comprises:
a resin-based binding component binding the first powder and the second powder to another material contained in the compression molded core.

13. The compression molded core according to claim 12, wherein the Fe-based amorphous alloy further contains at least Ni, B, and Cr.

14. An inductor comprising the compression molded core according to claim 11, a coil, and connection terminals connected to each of ends of the coil, wherein
the compression molded core is disposed so as to be at least partially located in an inductive magnetic field generated by a current when the current flows in the coil through the connection terminals.

15. The inductor according to claim 14, wherein an initial permeability μ(0) measured at a condition of 1 MHz, a relative magnetic permeability μ(8) measured at a condition of 1 MHz when an external magnetic field is 8 kA/m, and an iron loss Pcv (unit: kW/m$^3$) measured at a condition of applying a magnetic field having an effective maximum magnetic flux density of 15 mT at a frequency of 2 MHz satisfy a following expression (I):

$$\mu(0)\times\mu(8)/Pcv > 3.2\ kW^{-1}m^3 \quad (I).$$

16. A compression molded core comprising a plurality of types of powders each formed of a soft magnetic material,
wherein a median diameter of each powder is defined as a particle diameter at which an integrated particle diameter distribution becomes 50% when accumulated from a small particle size side based on a volume-based particle size distribution measured by a laser diffraction/scattering method,
wherein the plurality of types of powders include:
a first powder made of an amorphous magnetic material and having a first median diameter D1 which is a greatest median diameter among the median diameters of the plurality of types of powders; and
a second powder made of a crystalline magnetic material and having a second median diameter D2 which is a smallest median diameter among the median diameters of the plurality of types of powders, the second median diameter D2 being smaller than the first median diameter D1,
wherein the first powder has a first weight ratio R1 which is a ratio of a weight of the first powder to a total weight of the first powder and the second powder in the compression molded core, while the second powder has a second weight ratio R2 which is a ratio of a weight of the second powder to the total weight of the first powder and the second powder in the compression molded core, an average median diameter DT being defined as DT=R1×D1+R2×D2,
and wherein the second weight ratio R2, the first median diameter D1, the second median diameter D2, and the average median diameter DT satisfy following expressions (1) to (5):

$$0.4 \leq R2 \leq 0.7 \quad (1)$$

$$0.49 \leq (D1-D2)/D1 \leq 0.6 \quad (2)$$

$$D1 \leq 7\ \mu m \quad (3)$$

$$4.4\ \mu m \leq DT \leq 5.7\ \mu m \quad (4)$$

$$D2 \leq 3.9\ \mu m \quad (5).$$

17. The compression molded core according to claim 16,
wherein the amorphous magnetic material includes an Fe-based amorphous alloy containing at least Fe, P, and C, and the crystalline magnetic material includes at least one of an Fe—Si—Cr alloy and an Fe—Ni alloy,
and wherein the compression molded core further comprises:
a resin-based binding component binding the first powder and the second powder to another material contained in the compression molded core.

18. The compression molded core according to claim 17, wherein the Fe-based amorphous alloy further contains at least Ni, B, and Cr.

19. An inductor comprising the compression molded core according to claim 16, a coil, and connection terminals connected to each of ends of the coil, wherein
the compression molded core is disposed so as to be at least partially located in an inductive magnetic field generated by a current when the current flows in the coil through the connection terminals.

20. The inductor according to claim 19, wherein an initial permeability μ(0) measured at a condition of 1 MHz, a relative magnetic permeability μ(8) measured at a condition of 1 MHz when an external magnetic field is 8 kA/m, and an iron loss Pcv (unit: $kW/m^3$) measured at a condition of applying a magnetic field having an effective maximum magnetic flux density of 15 mT at a frequency of 2 MHz satisfy a following expression (I):

$$\mu(0)\times\mu(8)/Pcv>3.2\ kW^{-1}m^3 \quad (I).$$

* * * * *